(12) United States Patent
Morris et al.

(10) Patent No.:  US 12,613,715 B2
(45) Date of Patent:  Apr. 28, 2026

(54) DYNAMIC MANAGEMENT OF DISPLAY CONTENT

(71) Applicant: Wayne Fueling Systems LLC, Austin, TX (US)

(72) Inventors: John Joseph Morris, Austin, TX (US); Dan Seymour, Round Rock, TX (US); Meer Parekh, Austin, TX (US); Scott R. Negley, III, Austin, TX (US); Anand Krishna, Bangalore (IN); Rohith Chinnaswamy, Round Rock, TX (US)

(73) Assignee: Wayne Fueling Systems LLC, Austin, TX (US)

( * ) Notice: Subject to any disclaimer, the term of this patent is extended or adjusted under 35 U.S.C. 154(b) by 145 days.

(21) Appl. No.: 18/476,765

(22) Filed: Sep. 28, 2023

(65) Prior Publication Data

US 2024/0111552 A1     Apr. 4, 2024

Related U.S. Application Data

(60) Provisional application No. 63/478,827, filed on Jan. 6, 2023, provisional application No. 63/377,931, filed on Sep. 30, 2022.

(51) Int. Cl.
*G06F 9/451*     (2018.01)
*G06F 3/0484*     (2022.01)

(52) U.S. Cl.
CPC ............ *G06F 9/451* (2018.02); *G06F 3/0484* (2013.01)

(58) Field of Classification Search
CPC ... G06F 9/451; G06F 3/0484; G06Q 30/0268; G06Q 30/0276; G06Q 30/0259
See application file for complete search history.

(56) References Cited

U.S. PATENT DOCUMENTS 5,890,520 A     4/1999   Johnson, Jr.
6,032,126 A     2/2000   Kaehler
(Continued)

FOREIGN PATENT DOCUMENTS

WO     WO-2009023782 A1     2/2009

OTHER PUBLICATIONS

International Search Report and Written Opinion for PCT Patent Application No. PCT/US2023/075338 mailed Nov. 24, 2023.
(Continued)

*Primary Examiner* — Andrey Belousov
(74) *Attorney, Agent, or Firm* — Mintz, Levin, Cohn, Ferris, Glovsky and Popeo, P.C.

(57)     ABSTRACT

Various exemplary devices, systems, and methods for dynamic management of display content are provided. In general, a terminal can be configured to output media to a user of the terminal, such as by showing media on a display of the terminal, which can be a fuel dispenser or other type of terminal. In an exemplary implementation, the terminal is configured to receive media information from a remote system that is located remotely from a site that includes the terminal. The media output by the terminal is based on the received media information but is configured to be customized locally before being output by the terminal. The local customization is configured to dynamically configure the media information to include at least one customized aspect specific to the terminal and/or to the site at which the terminal is located.

20 Claims, 9 Drawing Sheets

(56) References Cited

U.S. PATENT DOCUMENTS

| | | | |
|---|---|---|---|
| 6,098,879 | A | 8/2000 | Terranova |
| 7,107,231 | B1 | 9/2006 | Hall et al. |
| 10,214,411 | B2 | 2/2019 | Fieglein et al. |
| 10,269,082 | B2 | 4/2019 | Morris et al. |
| 10,577,237 | B2 | 3/2020 | Fieglein |
| 10,678,837 | B2 | 6/2020 | Fieglein et al. |
| 10,726,508 | B2 | 7/2020 | Morris et al. |
| 11,276,051 | B2 | 3/2022 | Tang et al. |
| 11,429,945 | B2 | 8/2022 | Fieglein et al. |
| 2001/0034567 | A1 | 10/2001 | Allen et al. |
| 2002/0023028 | A1 | 2/2002 | Quarendon et al. |
| 2002/0042741 | A1 | 4/2002 | Wilson et al. |
| 2008/0262928 | A1 | 10/2008 | Michaelis |
| 2010/0246669 | A1 | 9/2010 | Harel |
| 2010/0313235 | A1 | 12/2010 | Straub |
| 2010/0313236 | A1 | 12/2010 | Straub |
| 2011/0226854 | A1 | 9/2011 | Stoudt et al. |
| 2013/0006776 | A1 | 1/2013 | Miller et al. |
| 2015/0360932 | A1 | 12/2015 | Bergqvist |
| 2017/0308965 | A1* | 10/2017 | Morris .............. G06Q 30/0251 |
| 2017/0329773 | A1* | 11/2017 | Fieglein ................. G06F 16/43 |
| 2018/0108205 | A1 | 4/2018 | Symonds et al. |
| 2020/0167751 | A1* | 5/2020 | Fieglein ................ G06Q 20/20 |
| 2020/0293567 | A1 | 9/2020 | Fieglein et al. |
| 2023/0196360 | A1 | 6/2023 | Weston et al. |

OTHER PUBLICATIONS

Dover Fueling Solutions, An Immersive Digital Consumer Experience—Right at the Dispenser, DX Promote™, Aug. 29, 2022.
Dover Fueling Solutions, Proactive Fuel Dispenser Uptime and Security Monitoring and Management, DX Monitor™, Aug. 29, 2022.
Dover Fueling Solutions, User Guide, DX Monitor™ Remote Monitoring and Management Solution, DFS DX™ Software Platform, May 2021.
Dover Fueling Solutions, User Guide, DX Promote™ Media Portal, DFS DX™ Connected Solutions Platform, Dec. 5, 2022.

* cited by examiner

Configure default media content at remote system — 202

Transmit default data characterizing the default media content from remote system to intermediar(y/ies) and/or terminal(s) — 204

Customize default media content at intermediar(y/ies) and/or terminal(s) to generate customized media content — 206

Output customized media content at terminal(s) — 208

FIG. 4A

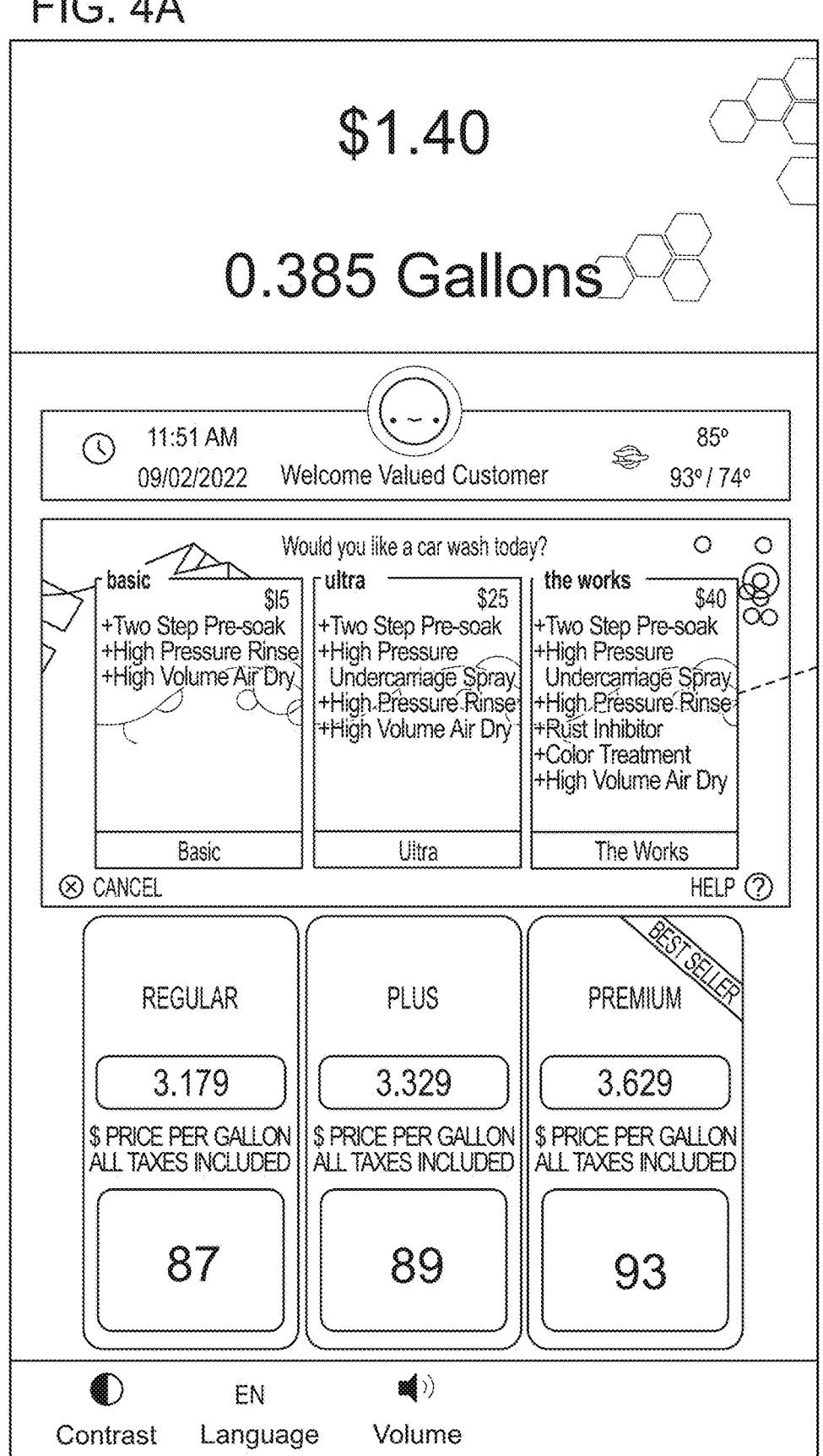

$1.40

0.385 Gallons

300

🕐 11:51 AM          Welcome Valued Customer          85°
09/02/2022                                             93° / 74°

Would you like a car wash today?

basic                    ultra                          the works
$15                          $25                                $40
+Two Step Pre-soak           +Two Step Pre-soak                 +Two Step Pre-soak
+High Pressure Rinse         +High Pressure                     +High Pressure
+High Volume Air Dry           Undercarriage Spray                Undercarriage Spray
                             +High Pressure Rinse               +High Pressure Rinse
                             +High Volume Air Dry               +Rust Inhibitor
                                                                +Color Treatment
                                                                +High Volume Air Dry Basic                        Ultra                              The Works

⊗ CANCEL                                                        HELP ?

BEST SELLER

REGULAR               PLUS                PREMIUM 3.179                 3.329               3.629

$ PRICE PER GALLON    $ PRICE PER GALLON    $ PRICE PER GALLON
ALL TAXES INCLUDED    ALL TAXES INCLUDED    ALL TAXES INCLUDED 87                    89                  93

◐                     EN                  🔊))
Contrast          Language              Volume

402

500

600

Initiate a fueling transaction — 602

Project a graphical prompt to a user requesting input whether the user would like to use a car wash terminal — 604

Receive, by the fuel dispenser, affirmative user input — 606

Generate optimized graphical car wash promotion data — 608

Output optimized graphical car wash promotion data at the fuel dispenser — 610

FIG. 9

DYNAMIC MANAGEMENT OF DISPLAY CONTENT

CROSS-REFERENCE TO RELATED APPLICATIONS

This application claims priority to U.S. Provisional Patent Application No. 63/377,931 filed Sep. 30, 2022, entitled "Remote Promotion System" and U.S. Provisional Patent Application No. 63/478,827 filed Jan. 6, 2023, entitled "Systems and Methods for Dynamic Management of Fuel Dispenser Display Content," which are hereby incorporated herein by reference in their entireties.

FIELD

The present disclosure relates generally to dynamic management of display content.

BACKGROUND

The retail petroleum industry utilizes various types of fuel dispensers for dispensing fuel to customers. A dispenser controller is often on the same premises as the fuel dispensers and coupled to a store interface unit so that a site attendant can monitor and control particular fueling dispensers from a building at the site (e.g., a gas station or other store). The dispenser controller sends data signals to the fuel dispensers providing various information and commands thereto. The information often includes include media for display on the fuel dispenser's display screen. Thus, traditionally, the dispenser controller transmits the media information to fuel dispensers at a same fueling site (e.g., same fueling station, same store, etc.), so the media received by fuel dispensers is limited to media for that fueling site, which may result in a lack of consistency in media content and/or media formatting across a merchant's fueling sites. Such a lack of consistency may negatively impact merchant branding and marketing and/or may degrade customer experience since different media content and/or media formatting can be provided at different ones of the merchant's fueling sites.

The dispenser controller traditionally communicates with a remote source, such as a network operating center (NOC), to receive media for transmission to the fuel dispensers. This communication model requires the fuel dispenser to communicate with the remote source with the dispenser controller as an intermediary. The fuel dispenser is thus reliant on the dispenser controller to receive updated media, which may result in delayed receipt, and therefore delayed display, of media at the fuel dispensers and/or may result in only media that is non-specific to the fueling site being available for display on the fuel dispensers.

Accordingly, there remains a need for improved management of display content.

SUMMARY

In general, devices, systems, and methods for dynamic management of display content are provided.

In one aspect, a media management system is provided that in one implementation includes a terminal configured to display customized graphical media content on a display of the terminal. The customized graphical media content is customized locally to the terminal based on default data characterizing default graphical media content configured at and received from a remote server. The customized graphical media content is customized dynamically in response to interaction of a user with the terminal.

The media management system can vary in any number of ways. For example, the terminal can be configured to receive the default data directly from the remote server, and the terminal is configured to customize the received default graphical media content.

For another example, the terminal can be configured to receive the default data indirectly from the remote server via an intermediary computing system, and the terminal can be configured to customize the received default graphical media content. Further, the media management system can further include the intermediary computing system.

For yet another example, an intermediary computing system is configured to receive the default data from the remote server, and the intermediary computing system can be configured to customize the received default graphical media content and to provide the customized graphical media content to the terminal. Further, the media management system can further include the intermediary computing system.

For another example, the interaction of the user with the terminal can include a user input to the terminal.

For yet another example, the default graphical media content can include default graphical promotion data characterizing default media content, and the customizing can include adding price information.

For still another example, the terminal can be a fuel dispenser, the default graphical media content can include content regarding car washing, and the customizing can include customizing at least one of car wash price information, car wash type information, and car wash action information. Further, the interaction of the user with the terminal can include a user input to the fuel dispenser indicative of interest in a car wash.

For yet another example, the terminal can be a fuel dispenser, the default graphical media content can include content regarding fuel, and the customizing can include customizing at least one of fuel price information, fuel type information, and fuel grade information. Further, the interaction of the user with the terminal can include the user initiating a fueling transaction.

For still another example, the terminal can be a fuel dispenser, the fuel dispenser can be configured to receive the default data directly from the remote server, and the fuel dispenser can be configured to customize the received default graphical media content. Further, the media management system can further include the remote system.

For another example, the terminal can be a fuel dispenser, an intermediary computing system located at a same fueling station as the fuel dispenser can be configured to receive the default data directly from the remote server, and the fuel dispenser can be configured to customize the default graphical media content. Further, the media management system can further include the intermediary computing system.

For still another example, the terminal can be a fuel dispenser, an intermediary computing system located at a same fueling station as the fuel dispenser can be configured to receive the default data directly from the remote server, the intermediary computing system can be configured to customize the received default graphical media content, and the fuel dispenser can be configured to receive customized data characterizing the customized graphical media content from the intermediary computing system. Further, the media management system can further include the intermediary computing system.

For yet another example, the terminal can be a dispenser configured to dispense a good.

For another example, the terminal can be one of an automatic teller machine, an electrical charging kiosk, an air machine, a parking meter, and a vending machine.

For still another example, the media management system can further include the remote server.

For yet another example, the media management system can further include a plurality of additional terminals each located at a same site as the terminal, each of the plurality of additional terminals being configured to display customized graphical media content on a display thereof that is customized locally to the terminal based on the default data and is customized dynamically in response to interaction of a user with the terminal.

For yet another example, the media management system can further include a plurality of additional terminals each located at one or more sites different from a site at which the terminal is located, each of the plurality of additional terminals being configured to display customized graphical media content on a display thereof that is customized locally to the terminal based on the default data and is customized dynamically in response to interaction of a user with the terminal.

In another aspect, a computer-implemented method is provided that in one implementation includes receiving, from a remote server, default data characterizing default graphical media content configured to be displayed. The method also includes, in response to interaction of a user with a terminal, customizing the received default graphical media content to include at least one customized aspect specific to at least one of the terminal and a site at which the terminal is located. The method also includes displaying the customized graphical media content on a display of the terminal.

The method can vary in any number of ways. For example, the terminal can receive the default data directly from the remote server, and the terminal can customize the received default graphical media content.

For another example, an intermediary computing system can receive the default data directly from the remote server, the intermediary computing system can customize the received default graphical media content, and the method can further include the terminal receiving customized data characterizing the customized graphical media content from the intermediary computing system.

For yet another example, the interaction of the user with the terminal can includes a user input to the terminal.

For still another example, the default graphical media content can includes default graphical promotion data characterizing default media content, and the customizing can include adding price information.

For yet another example, the terminal can be a fuel dispenser, the default graphical media content can include content regarding car washing, and the customizing can include customizing at least one of car wash price information, car wash type information, and car wash action information. Further, the interaction of the user with the terminal can include a user input to the fuel dispenser indicative of interest in a car wash.

For still another example, the terminal can be a fuel dispenser, the default graphical media content can include content regarding fuel, and the customizing can include customizing at least one of fuel price information, fuel type information, and fuel grade information. Further, the interaction of the user with the terminal can include the user initiating a fueling transaction.

For another example, the terminal can be a fuel dispenser, the fuel dispenser can receive the default data directly from the remote server, and the fuel dispenser can customize the received default graphical media content.

For another example, the terminal can be a fuel dispenser, an intermediary computing system located at a same fueling station as the fuel dispenser can receive the default data directly from the remote server, the method can further include the fuel dispenser receiving default data from the intermediary computing system, and the fuel dispenser can customize the received default graphical media content.

For yet another example, the terminal can be a fuel dispenser, an intermediary computing system located at a same fueling station as the fuel dispenser can receive the default data directly from the remote server, the intermediary computing system can customize the received default graphical media content, and the method can further include the fuel dispenser receiving customized data characterizing the customized graphical media content from the intermediary computing system.

For yet another example, the terminal can be a fuel dispenser.

For still another example, the terminal can be a dispenser configured to dispense a good.

For another example, the terminal can be one of an automatic teller machine, an electrical charging kiosk, an air machine, a parking meter, and a vending machine.

For yet another example, the method can further include displaying, at each of a plurality of additional terminals each located at a same site as the terminal, customized graphical media content on a display thereof that is customized locally to the terminal based on the default data and is customized dynamically in response to interaction of a user with the terminal.

For another example, the method can further include displaying, at each of a plurality of additional terminals each located at one or more sites different from a site at which the terminal is located, customized graphical media content on a display thereof that is customized locally to the terminal based on the default data and is customized dynamically in response to interaction of a user with the terminal.

BRIEF DESCRIPTION OF DRAWINGS

The embodiments described above will be more fully understood from the following detailed description taken in conjunction with the accompanying drawings. The drawings are not intended to be drawn to scale. For purposes of clarity, not every component may be labeled in every drawing. In the drawings:

FIG. 4A is a first portion of one implementation of display content;

FIG. 9 is a schematic view of one implementation of a computing system.

DETAILED DESCRIPTION

Figure 1:
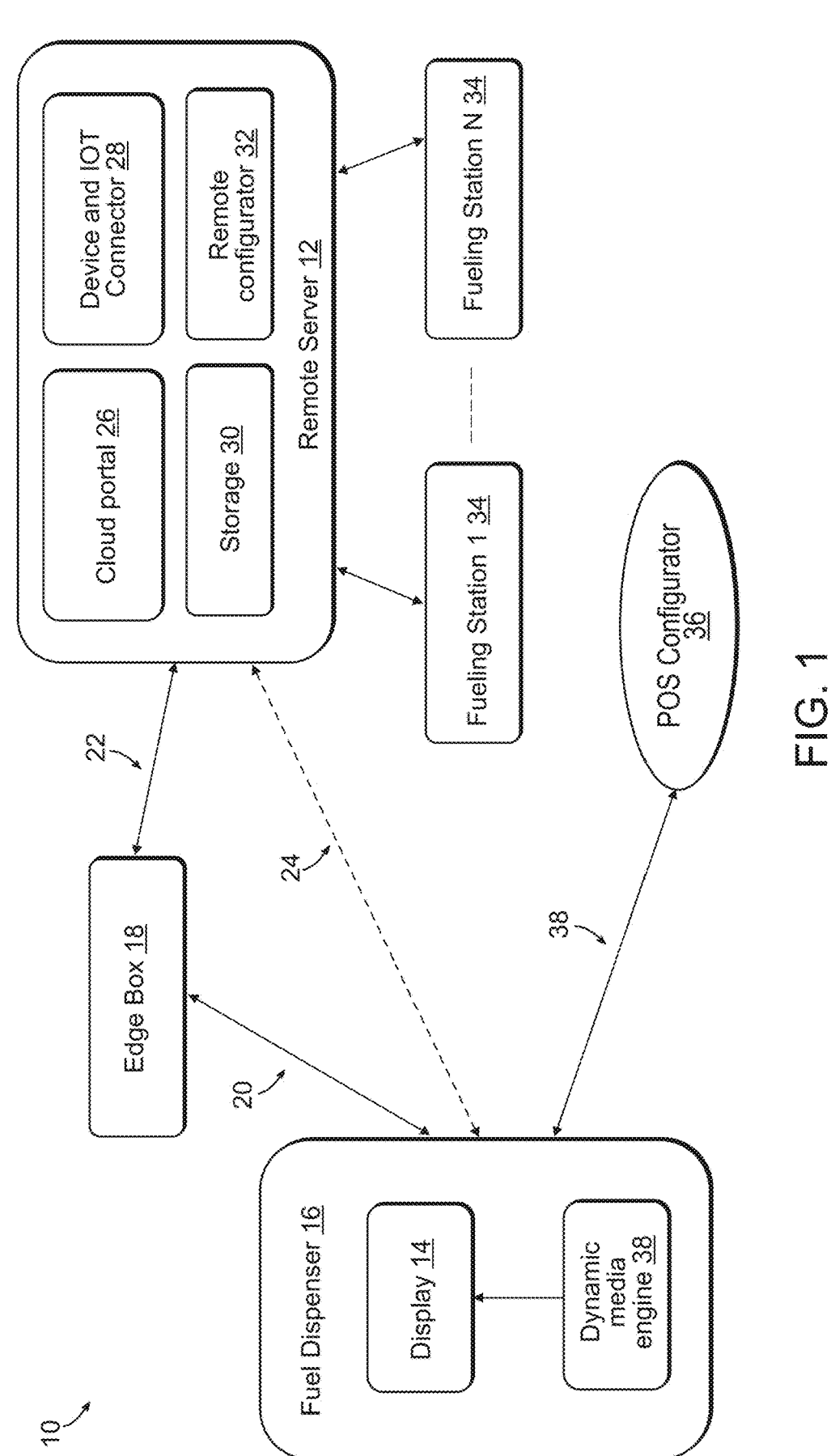
FIG. 1 is a schematic view of one implementation of a system for dynamic management of display content.

Certain exemplary embodiments will now be described to provide an overall understanding of the principles of the structure, function, manufacture, and use of the devices, systems, and methods disclosed herein. One or more examples of these embodiments are illustrated in the accompanying drawings.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape. Sizes and shapes of the systems and devices, and components thereof, can depend at least on the dimensions of the subject in which the systems and devices will be used, the size and shape of components with which the systems and devices will be used, and the methods with which the systems and devices will be used.

Various exemplary devices, systems, and methods for dynamic management of display content are provided. In general, a terminal can be configured to output media to a user of the terminal, such as by showing media on a display of the terminal. In an exemplary implementation, the terminal is configured to receive media information from a remote system (e.g., a computing system such as a cloud-based server, a device and Internet of Things ("IOT") connector, etc.) that is located remotely from a site (e.g., a fueling station, a store, etc.) that includes the terminal. The media output by the terminal is based on the received media information but is configured to be customized locally before being output by the terminal. The local customization is configured to dynamically configure the media information to include at least one customized aspect specific to the terminal and/or to the site at which the terminal is located. Therefore, the media output by the terminal may have branding and marketing features consistent with media output by other terminals at other sites since the remote system can provide consistently formatted media for display (or other output) at all of the terminals, and/or the media output by the terminal may be the same content provided at all of the merchant's sites but have customized aspect(s) to reflect a particular site's circumstances.

For example, fuel at one fueling station may have a different price than fuel at another fueling station even if it is the same type and/or grade of fuel. The media information being customized may allow for the fuel price at the fueling station at which the terminal is located to be included in the output media. The output media including the real-time price of the fuel available at the site may improve customer experience since the customer will be able to easily know the real-time price.

For another example, fuel at one fueling station may be available in different grades than fuel at another fueling station. The media information being customized may allow for the fuel grade(s) available at the fueling station at which the terminal is located to be included in the output media. The output media including the availability of fuel grades at the site may improve customer experience since the customer will be able to easily know the available fuel grades and not be presented with information related to a fuel grade that is unavailable at the customer's current location.

For still another example, fuel at one fueling station may be available in different fuel types (e.g., gasoline, diesel, diesel exhaust fluid ("DEF"), hydrogen, liquefied petroleum gas ("LPG"), compressed natural gas ("CNG"), etc.) than fuel at another fueling station. The media information being customized may allow for the fuel type(s) available at the fueling station at which the terminal is located to be included in the output media. The output media including the availability of fuel types at the site may improve customer experience since the customer will be able to easily know the available fuel types and not be presented with information related to a fuel type that is unavailable at the customer's current location.

For yet another example, a car wash at one fueling station may have a different price than a car wash at another fueling station. The media information being customized may allow for the car wash price at the fueling station at which the terminal is located to be included in the output media. The output media including the real-time price of the car wash available at the site may improve customer experience since the customer will be able to easily know the real-time price.

For still another example, a car wash at one fueling station may have different capabilities than a car wash at another fueling station, e.g., a rust inhibitor is available at one car wash but not the other, a high pressure rinse is available at one car wash but not the other, one car wash may offer only one type of car wash service while another car wash may offer multiple types of car wash services that each has a different price and includes different car war options, etc. The media information being customized may allow for the capabilities of the car wash at the fueling station at which the terminal is located to be included in the output media. A customer may therefore not be offered or expect a car wash capability that is unavailable at the site at which the customer is located.

For yet another example, some fueling stations may not have a car wash or the car wash may be temporarily out of service, while other fueling stations may have an in-service car wash. The media information being customized may allow for fueling stations without a car wash or with an out-of-service car wash to not include any mention of a car wash in the media and for fueling stations with an in-service car wash to include mention of a car wash in the media. A customer may therefore not be offered a car wash purchase if car washing is unavailable (permanently or temporarily) at the site at which the customer is located.

For another example, some fueling stations may not have an air machine (such as for providing air to tires) or the air machine may be temporarily out of service, while other fueling stations may have an in-service air machine. The media information being customized may allow for fueling stations without an air machine or with an out-of-service air machine to not include any mention of an air machine in the media and for fueling stations with an in-service air machine to include mention of an air machine in the media. A customer may therefore not be offered air purchase from an air machine if an air machine is unavailable (permanently or temporarily) at the site at which the customer is located.

For still another example, a site at which the terminal is located may have different good(s)/service(s) available for purchase than at other sites. The media information being customized may allow for the media to reference only good(s)/service(s) that are available for purchase at the site at which the terminal is located. A customer may therefore not be offered a purchase of a particular good or service if that particular good or service is unavailable (permanently or temporarily) at the site at which the customer is located.

For yet another example, sites in different, remotely located geographic areas have different weather conditions. The media information being customized may allow for the media to show the current weather condition and/or current weather forecast for the site at which the customer is located.

For another example, sites in different, remotely located geographic areas have different traffic conditions. The media information being customized may allow for the media to show the current traffic condition and/or current traffic forecast for the site at which the customer is located.

The local optimization of the media received from the remote system can be performed by the terminal or by at least one intermediary (e.g., a computing system such as a forecourt controller, an Edge box, etc.) communicatively coupled with the terminal. In some implementations, the intermediary is located indoors, e.g., inside of a store's building at a same site as the terminal, and the terminal is located outdoors, e.g., in a store's parking lot, as a kiosk next to a store's front door, in a fuel station's forecourt, etc. An intermediary being located indoors may improve security by limiting third party access to the intermediary and/or may help provide weather protection for the intermediary. Terminals may be located outdoors for any of a variety of reasons, such as because good(s)/service(s) being paid for are dispensed outdoors by the terminal for safety, convenience, or other reasons, because it allows for good(s)/service(s) to be purchased from a merchant when the store's building in which the POS is located is closed, etc. However, in some implementations in which the intermediary is located indoors, a terminal is located indoors, such as for weather protection, security, etc. In other implementations, the intermediary is located outdoors, and the terminal is located either indoors or outdoors.

The terminal can be configured to communicate directly with the remote system (e.g., without an intermediary) and receive the media information directly from the remote system, and/or the terminal can be configured to communicate indirectly with the remote system via at least one intermediary so as to receive the media information indirectly from the remote system via the at least one intermediary. In implementations in which the terminal is configured to only communicate directly with the remote system, the terminal is configured to customize the media information received from the remote system. In implementations in which the terminal is configured to only communicate indirectly with the remote system, the at least one intermediary is configured to customize the media information received from the remote system. Processing resources may thus be present at the at least one intermediary instead of the fuel dispenser, which may facilitate media management for legacy dispensers with low processing capability and/or may help ensure consistency across all fuel dispensers at a fueling station since the at least one intermediary can customize the media information for all of the fuel dispensers. In implementations in which the terminal is configured to communicate directly with the remote system and is configured to communicate indirectly with the remote system, the terminal can be configured to perform all the customizing, or the terminal can be configured to perform the customizing of only the media information received directly from the remote system and the at least one intermediary can be configured to perform the customizing of only the media information received at the at least one intermediary from the remote system.

The media information transmitted from the remote system can include one or more of various types of media. For example, the media can include advertisements for goods and/or services. The terminal(s) receiving the advertisements may thus output advertising content (e.g., notices of goods/services, coupons, promotions (e.g., free coffee with fuel purchase, free minutes of parking with minimum time purchase for parking, buy one get one free, etc.), "flash" deals, etc.) to users thereof, which may increase revenue for merchants. The goods can include any of a variety of types of goods, such as durable goods (e.g., vehicle parts, toys, air for tires, etc.), perishable goods (e.g., fuel, food, drink, etc.), and intangible goods (e.g., software, digital media, etc.). The services can include any of a variety of types of services (e.g., oil changes, car washes, etc.). For another example, the media can include entertainment content, such as television content and music content. The terminal(s) receiving the entertainment content may thus output entertainment to users thereof, which may improve user experience during use of the terminal. For yet another example, the media can include geographic content such as maps and traffic conditions. The terminal(s) receiving the geographic content may thus output information geographically relevant to users of the terminal(s). For still another example, the media can include weather content. The terminal(s) receiving the weather content may thus output information indicative of weather conditions relevant to users of the terminal(s).

The form of the media can be visually displayable, which may be visual only (e.g., a still image, a silent video, etc.) or may be a combination of visual and audible (e.g., a video with sound, narrated still image, etc.), or can be audible only (e.g., music, a spoken message, etc.)\. The media can be visually and/or audibly displayed and allow the user to access a coupon or other printable and/or electronically savable promotion for later use by the customer. For example, displayed media can include a message indicating that a coupon or promotion is available to a customer for a particular good or service that the customer may print for later use and/or access electronically for later use.

The terminal can have a variety of forms. In an exemplary implementation, the terminal includes a dispenser configured to dispense a good. Examples of terminals configured to dispense a good include fuel dispensers configured to dispense fuel, electrical charging kiosks configured to dispense electricity (such as for an electric vehicle, for a mobile phone, etc.), vending machines configured to dispense food, electronics, or other good, automated teller machines (ATMs) configured to dispense money, and the like. In another exemplary implementation, the terminal includes a terminal configured to accept payment for goods and/or services. A terminal may be configured to dispense a good and to accept payment for goods and/or services, for example a fuel dispenser, an electrical charging kiosk, a vending machine, and the like. Examples of goods and services include fuel, a parking space, a pharmacy item, groceries to be delivered, electricity, a car wash, public transit, and the like. Examples of terminals configured to accept payment for goods and/or services without dispensing a good include parking meters, payment kiosks (such as at a parking garage, and the like), and the like.

FIG. 1 illustrates one implementation of a system 10 for dynamic management of fuel dispenser display content. As shown, the system 10 includes a remote system 12 (shown as a remote server 12 in this illustrated implementation) that is configured to generate and provide content to be presented on a display 14 of a terminal 16 (shown as a fuel dispenser 16 in this illustrated implementation).

Figures 2, 3:
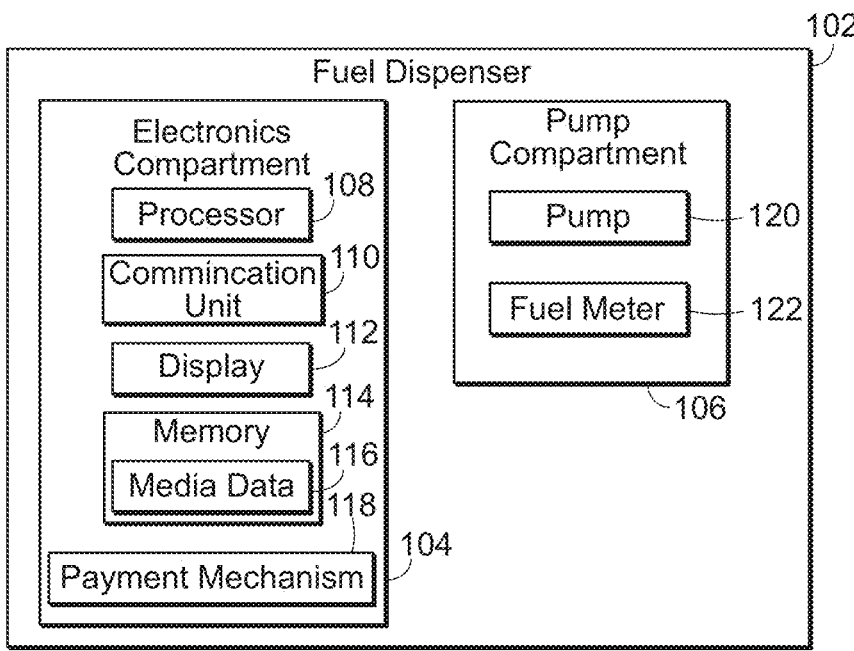
FIG. 2 is a schematic view of one implementation of a fuel dispenser.
FIG. 3 is a flowchart of one implementation of a method for dynamic management of display content.

FIG. 2 illustrates one implementation of a fuel dispenser 102 that can be used as the fuel dispenser 16 of FIG. 1. As shown in FIG. 2, the fuel dispenser 102 includes an electronics compartment 104 and a pump compartment 106. The electronics compartment 104 has therein electronics for facilitating payment for fuel (and/or other good and/or services) and for facilitating the dispensing of the fuel. The electronics include, for example, a processor 108 configured to control various electronic components of the fuel dispenser 102 and dispensing of the fuel from the pump compartment 106, a communication unit 110 configured to electronically communicate wired and/or wirelessly over a network, a display 112 configured to show information (e.g., media content, payment information, etc.) thereon, a memory 114 configured to store data, including media data 116, therein that is readable by the processor 108, and a payment mechanism 118 (e.g., a card reader, a Near Field Communication (NFC) module, etc.) configured to facilitate payment for fuel (and/or other good and/or services). The fuel dispenser 102 can be configured for mobile payment in addition to (or instead of) payment through the fuel dispenser 102.

The display 112 is configured to show information to a user of the fuel dispenser 16. The display 112 can have any of a variety of configurations, such as a cathode ray tube (CRT) screen, a liquid crystal display (LCD) screen, a light emitting diode (LED) screen, a touchscreen, and the like. The display 112 can include a single display. Alternatively, the display 112 can include multiple displays. For example, a first display 112 can be on a front side of the fuel dispenser 102 and a second display 112 can be on a back side of the fuel dispenser 102. For another example, the display 112 can include two displays mounted next to each other to increase an overall display size. For yet another example, the display 112 can include first and second displays mounted next to each other on a front side of the fuel dispenser 102 and can include third and fourth mounted next to each other on a back side of the fuel dispenser 102.

The fuel dispenser 102 can, in some implementations, include at least one media output device in addition to the display 112. For example, the at least one media output device can include a speaker configured to output audio therefrom.

The communication unit 110 can have a variety of configurations. The communication unit 110 is configured to communicate wirelessly in an exemplary implementation, which may facilitate communication with a remote system (e.g., the remote server 12 of FIG. 1, etc.) and/or may facilitate setup of the communication. The communication unit 110 can be configured to facilitate wireless communication over a communication link and can include, e.g., a transceiver communicating via any of a variety of wireless techniques, e.g., Bluetooth protocol, cellular protocol, WIFI protocol, near field communication (NFC), a radio frequency identification (RFID) protocol, etc. Any of a variety of types of wireless connectivity hardware can be used for the wireless connectivity, as will be appreciated by a person skilled in the art. The wireless communication can be according to any of a variety of communication protocols, e.g., TCP/IP, etc., as will also be appreciated by a person skilled in the art. The wireless connectivity may facilitate wireless mesh network communication, as will be appreciated by a person skilled in the art. The types of wireless connectivity that the communication unit 110 includes can be chosen by an owner of the fuel dispenser 102 according to the owner's current fueling site setup and/or future fueling site plans, and the communication unit 110 may be manufactured and/or updated accordingly.

In some implementations, the communication unit 110 is configured to communicate over a wired connection in addition to or instead of over a wireless connection. A wired connection may be used, for example, for a local communication link between the fuel dispenser 102 and a local computing system external to the fuel dispenser 102 (e.g., an intermediary such as the Edge box 18 of FIG. 1, a point of sale (POS) configurator such as the POS configurator 36 of FIG. 1, etc.). A wired connection may provide more security and/or stability than a wireless connection and/or may allow a legacy fuel dispenser configured to communicate only via one or more wired connections to implement dynamic management of display content as described herein. Wired communication can occur via any of a variety of wired communication protocols, e.g., TCP/IP, etc., as will be appreciated by a person skilled in the art. Some fuel dispensers are manufactured with two-wire connectivity, and the wired communication can accordingly be via two wires, such as via a controller area network bus (CANBus) two wire connection, an RS485 two wire connection, a current loop connection, or other type of two wire connection. Some fuel dispensers are additionally or alternatively manufactured with cable connectivity and can accordingly be configured to provide wired communication via cable connection, such as an Ethernet cable or other network cable. Older fuel dispensers typically have two-wire connectivity capabilities while newer fuel dispensers typically have Ethernet connectivity capabilities instead.

The pump compartment 106 of the fuel dispenser 102 can, as in this illustrated implementation, have therein a pump 120 configured to pump fuel from a fuel tank or other reservoir and has therein a fuel meter 122 configured to monitor fuel flow. The pump compartment 106 can include other elements to facilitate fuel dispensing, such as valves, a vapor recovery system, etc., as will be appreciated by a person skilled in the art. Fuel is configured to flow through the pump compartment 106 to a hose (not shown) and out of a nozzle (not shown) at an end of the hose. The fuel dispenser 102 can include any number of hoses and associated nozzles.

A person skilled in the art will appreciate that the fuel dispensers 16, 102 of FIGS. 1 and 2 can have various other configurations. Various exemplary embodiments of fuel dispensers are described further in, for example, U.S. Pat. No. 10,214,411 entitled "Fuel Dispenser Communication" issued Feb. 26, 2019, U.S. Pat. No. 10,269,082 entitled "Intelligent Fuel Dispensers" issued Apr. 23, 2019, U.S. Pat. No. 10,577,237 entitled "Methods And Devices For Fuel Dispenser Electronic Communication" issued Mar. 3, 2020, U.S. Pat. No. 10,726,508 entitled "Intelligent Fuel Dispensers" issued Jul. 28, 2020, U.S. Pat. No. 11,276,051 entitled "Systems And Methods For Convenient And Secure Mobile Transactions" issued Mar. 15, 2022, U.S. Pat. No. 11,429, 945 entitled "Outdoor Payment Terminals" issued Aug. 30, 2022, and U.S. Pat. App. Pub. No. 2023/0196360 entitled "Conducting Fuel Dispensing Transactions" published Jun. 22, 2023, which are hereby incorporated by reference in their entireties.

In some embodiments, a fuel dispenser (e.g., the fuel dispenser 16 of FIG. 1, the fuel dispenser 102 of FIG. 2, etc.) can be configured to dispense type(s) of "fuel" besides a petroleum fuel. For example, the fuel dispenser can be configured to dispense hydrogen, liquid propane gas (LPG) or compressed natural gas (CNG), water, or the like. It will be understood that the fueling stations and the fuel dispensers described herein are not limited to petroleum gasoline in liquid format and that other types of fuel dispensers configured to dispense alternate types of "fuel" can be envisioned. For example, in some embodiments, the fuel dispenser can be a hydrogen fuel dispenser. For another example, in some embodiments, the fuel dispenser can be a natural gas fuel dispenser.

Referring again to FIG. 1, the fuel dispenser 16 is configured to communicate with the remote server 12 via an intermediary 18, which in this illustrated implementation is shown as an Edge box 18. In general, the Edge box 18 is configured as a computing system in the form of a server. As in this illustrated implementation, the Edge box 18 can be a local server located at a same fueling station as the fuel dispenser 16. In an exemplary implementation, the Edge box 18 is configured to perform at least some forecourt control functions traditionally performed by a forecourt controller, to serve as an intermediary interface between the fuel dispenser 16 (and any other fuel dispensers at a same fueling site as the fuel dispenser 16) and the remote server 12, and to serve as a data collection device. In other implementations, at least one other intermediary can replace the Edge box 18, such as a forecourt controller or other computing system. Additionally, although the Edge box 18 in this illustrated implementation is located at a same fueling station as the fuel dispenser 16, at least one intermediary configured to be communicatively coupled with the fuel dispenser 16 can be located offsite so as to not be located at a same fueling station as the fuel dispenser 16.

The fuel dispenser 16 is configured to communicate, e.g., using a communication unit such as the communication unit 110 of FIG. 2, with the Edge box 18 over a first communication link 20. The Edge box 18 is configured to communicate with the remote server 12 over a second communication link 22. In such a setup, the fuel dispenser 16 is configured to communicate indirectly with the remote server 12 via at least one intermediary, which is a single intermediary (the Edge box 18) in this illustrated implementation. As will be appreciated by a person skilled in the art, each of the first and second communication links 20, 22 can include a single communication link or a plurality of interconnected communication links. The communication over the first communication link 20 between the fuel dispenser 16 and the Edge box 18 can be wired or wireless. The communication over the second communication link 22 between the Edge box 18 and the remote server 12 is wireless over a network (e.g., the Internet, a wireless wide area network, a local area network, a wide area network, or the like).

In some implementations, in addition to or instead of being configured to communicate indirectly with the remote server 12, the fuel dispenser 16 is configured to communicate directly with the remote server 12 over a direct communication link 24. The communication over the direct communication link 24 between the fuel dispenser 16 and the remote server 12 is wireless over a network (e.g., the Internet, a wireless wide area network, a local area network, a wide area network, or the like). In implementations in which the remote server 12 is configured to communicate directly with the fuel dispenser 16, the Edge box 18 may be omitted.

The remote server 12 is illustrated in FIG. 1 as being only communicatively coupled to one fuel dispenser 16 at the fueling station via the Edge box 18 (and/or directly via the direct communication link 24). However, fueling stations typically have more than one fuel dispenser. Thus, each additional fuel dispenser located at a same fueling station as the fuel dispenser 16 is configured to be communicatively coupled to the remote server 12, indirectly and/or directly similar to that discussed above regarding the fuel dispenser 16. The remote server 12 can thus be configured to facilitate dynamic management of display content for all fuel dispensers at the fueling station.

Additionally, as illustrated in the exemplary implementation of FIG. 1, the remote server 12 can be configured to be communicatively coupled to a plurality of additional fuel dispensers at a plurality of fueling stations 34 different than the fueling station at which the fuel dispenser 16 of FIG. 1 is located. The remote server 12 is thus configured to facilitate dynamic management of display content at each of a plurality of different sites, which may avoid having to configure fuel dispensers located across multiple fueling stations individually. The different sites are geographically different from one another, such as in different cities, different states, and/or different countries. FIG. 1 shows "N" number of additional fuel stations, with each of the "N" fueling stations having thereat at least one fuel dispenser. The remote server 12 can be configured to communicate directly with each of the additional fuel dispensers, to communicate indirectly with each of the additional fuel dispensers, or to communicate directly with some of the additional fuel dispensers and indirectly with a reminder of the additional fuel dispensers.

In the exemplary implementation of FIG. 1, the remote server 12 is configured to be communicatively coupled only with fuel dispensers for dynamic management of display content. In some implementations, the remote server 12 can be configured to be communicatively coupled with at least one fuel dispenser for dynamic management of display content and at least one other type of terminal for dynamic management of display content. In some implementations, the at least one other type of terminal is located at the same fueling station(s) as the at least one fuel dispenser. The media output by the at least one other type of terminal and the at least one fuel dispenser may thus have branding and marketing features consistent with each other, and/or the media output by the at least one other type of terminal and the at least one fuel dispenser may be the same content provided at all of the merchant's sites but have customized aspect(s) to reflect a particular site's circumstances. In some implementations, the remote server 12 can be configured to be communicatively coupled only with at least one terminal that is not a fuel dispenser, as discussed above.

In some implementations, as in this illustrated implementation, the remote server 12 is configured to operate a cloud portal 26 that includes a user interface configured to permit an operator to configure media content. One exemplary implementation of the cloud portal 26 is the DX Promote™ Media Portal available from Dover Fueling Solutions of Austin, TX.

The media content configured to be configured via the cloud portal 26 includes default data characterizing default media content. As in the illustrated implementation of FIG. 1, the remote server 12 can also include a storage 30 including memory that is configured to store the default data characterizing default media content. The media content can be configured at any time and any number of times via the cloud portal 26, thereby allowing changes to be made as often as desired to reflect current marketing, current branding, current trends, etc.

The remote server 12 is configured to transmit the default data to the fuel dispenser 16 (indirectly or directly). In an exemplary implementation, the default data is transmitted securely using encryption, mutual authentication, and/or other security measure.

The received default data is configured to be customized by the Edge box 18 or the fuel dispenser 16, as discussed herein, prior to the media content being displayed on the fuel dispenser's display 14. Thus, the default media content is not shown on the fuel dispenser's display 14. Instead, customized media content is shown on the fuel dispenser's display 14.

In some implementations, the default media content includes default graphical promotion data characterizing default media content. For example, the default media content can include graphical media content including one or more default graphical advertisements for car wash service(s) available at a car wash terminal at the fueling station as the fuel dispenser 16. The customized media content for such default media content can, for example, add pricing for the car wash service(s) and/or modify the advertisement to only list capabilities of the car wash available at that fueling station. For another example, the default media content can include graphical media pertaining to goods and/or services offered at the fueling station at which the fuel dispenser 16 is located (e.g., car wash advertisements, in-store food coupons, in-store drink coupons, in-store food advertisements, in-store drink advertisements, coupon for air from an air machine, advertisement for an air machine, etc.). The customized media content for such default media content can, for example, add pricing for the goods and/or services, modify the advertisement to only list goods and/or services available at that fueling station, and/or adjust an amount of the coupon from the default amount.

In some implementations, the default media content includes default graphical weather data characterizing default media content. For example, the default media content can include graphical media content including one or more default graphical layouts for weather condition and/or weather forecast information. The customized media content for such default media content can, for example, add local weather condition and/or weather forecast information for the geographical area for fueling station at which the fuel dispenser 16 is located.

In some implementations, the default media content includes default graphical traffic data characterizing default media content. For example, the default media content can include graphical media content including one or more default graphical layouts for traffic condition and/or traffic forecast information. The customized media content for such default media content can, for example, add local traffic condition and/or traffic forecast information for the geographical area for fueling station at which the fuel dispenser 16 is located.

As in the illustrated implementation of FIG. 1, the remote server 12 can also include a device and IOT connector 28 that is configured to provide centralized, remote monitoring and management of the fuel dispenser 16 (e.g., remote updating of fuel dispenser software and/or firmware). One exemplary implementation of the device and IOT connector 28 is the DX Monitor™ available from Dover Fueling Solutions of Austin, TX.

As in the illustrated implementation of FIG. 1, the remote server 12 can also include a remote configurator 32. One exemplary implementation of the remote configurator 32 is the DX Promote™ platform available from Dover Fueling Solutions of Austin, TX.

The remote configurator 32 is configured to determine the default data and a relationship algorithm configured to determine one or more relationships between the default data stored in the cloud portal 26 (and/or the storage 30) and one or more rules for the default media content characterized by the default data. The one or more rules are configured to define how the default media content is locally customized, as discussed further below. For example, the default media content can include default graphical promotion data, and the one or more rules can include one or more pricing rules for good(s) and/or service(s). The element performing the customization (e.g., the fuel dispenser 16 or the Edge box 18) can thus be informed via the pricing rules how to modify the default media content using local pricing information, e.g., which prices to insert where in the media content. For example, the one or more pricing rules may include an association between an available car wash service and a purchase price for the available car wash service. For another example, the one or more pricing rules may include an association between an available good and a purchase price for the available good. For another example, the default media content can include default graphical weather data, and the one or more rules can include one or more weather rules. The element performing the customization (e.g., the fuel dispenser 16 or the Edge box 18) can thus be informed via the weather rules how to modify the default media content using local weather information, e.g., which available weather information to insert where in the media content. For another example, the default media content can include default graphical traffic data, and the one or more rules can include one or more traffic rules. The element performing the customization (e.g., the fuel dispenser 16 or the Edge box 18) can thus be informed via the traffic rules how to modify the default media content using local traffic information, e.g., which available traffic information to insert where in the media content.

In some implementations, the relationship algorithm is configured to determine the one or more relationships based on a degree of similarity between tags characterizing the default data and tags characterizing the one or more rules. In some implementations, the tags characterizing the default data and the tags characterizing the one or more rules are stored in the memory of the storage 30.

The default data transmitted from the remote server 12 to the Edge box 18 via the second communication link 22 (or directly to the fuel dispenser 16 via the direct communication link 24) is configured to include the tags and/or the output of the relationship algorithm from the remote server 12. The Edge box 18 (or the fuel dispenser 16) can thus use the tags and/or the output of the relationship algorithm to customize the default media content to generate customized media content for output by the fuel dispenser 16.

As shown in the illustrated implementation of FIG. 1, the fuel dispenser 16 can include a dynamic media engine 38. The dynamic media engine 38 is configured to customize the default data from the remote server 12 to generate the customized media content for output by the fuel dispenser 16. The fuel dispenser 16 in this illustrated embodiment is thus configured to generate the default media content. However, as mentioned above, the intermediary (e.g., the Edge box 18) can instead be configured to generate the default media content, in which case the intermediary includes a dynamic media engine similar to the dynamic media engine 38.

Additionally, as in the illustrated implementation of FIG. 1 and as referenced above, the system 10 can include a POS configurator 36. The POS configurator 36 is configured to be communicatively coupled with the fuel dispenser 16 over a third communication link 38. The POS configurator 36 is located at a same site (e.g., fueling station) as the fuel dispenser 16 and is configured as a computing system configured to store one or more local rules that correspond to rule(s) stored at the remote server 12, e.g., stored in the cloud portal 26 (and/or the storage 30). The POS configurator 36 is configured to transmit the one or more local rules to the fuel dispenser 16 over the third communication link 38. The fuel dispenser's dynamic media engine 38 is configured to use the received one or more local rules in customizing the default data. By the POS configurator 36 being a keeper of the one or more local rules, the one or more local rules may be updated at a centralized location and provided to the element(s) configured to customize the default data rather than having to update the one or more local rules at each of the element(s) configured to customize the default data, e.g., at each of the fuel dispensers at the fueling station that includes the fuel dispenser 16. For example, the one or more local rules can include one or more local pricing rules that correspond to one or more pricing rules stored at the remote server 12 that may be included in default data received at the fuel dispenser 16. In some implementations, the one or more local pricing rules may be established by an operator of the fueling station at which the fuel dispenser 16 is located.

FIG. 3 illustrates one exemplary method 200 of dynamic management of display content. The method 200 includes configuring 202 default media content at a remote system. For example, in the system 10 of FIG. 1, the remote server 12, e.g., the cloud portal 26 of the remote server 12, can configure 202 default media content.

The configuring 202 of the default media content includes formatting the media content for output. Using the example of graphical media content, the configuring 202 of the default media content includes formatting the graphics, including identity of the graphics and layout thereof. The default media content can thus have a consistent look and style for merchant branding and marketing.

The method 200 also includes transmitting 204 default data characterizing the default media content from the remote system to intermediar(y/ies) and/or terminals. For example, in the system 10 of FIG. 1, the remote server 12 can transmit 204 default data characterizing the default media content to the intermediary (e.g., the Edge box 18) via the second communication link 22 or to the fuel dispenser 16 via the direct communication link 24. The remote server 12 can also transmit 204 default data characterizing the default media content to intermediar(y/ies) and/or terminals at each of the additional fueling stations 34.

The method 200 also includes customizing 206 the default media content at the intermediar(y/ies) and/or terminals to generate customized media content. For example, in the system 10 of FIG. 1, the dynamic media engine 38 of the fuel dispenser 16 can customize 206 the default media content using one or more local rules received from the POS configurator 36.

The method 200 also includes outputting 208 the customized media content at one or more terminals. For example, in the system 10 of FIG. 1, the customized media content is output 208 on the display 14 of the fuel dispenser 16.

Figure 4B:
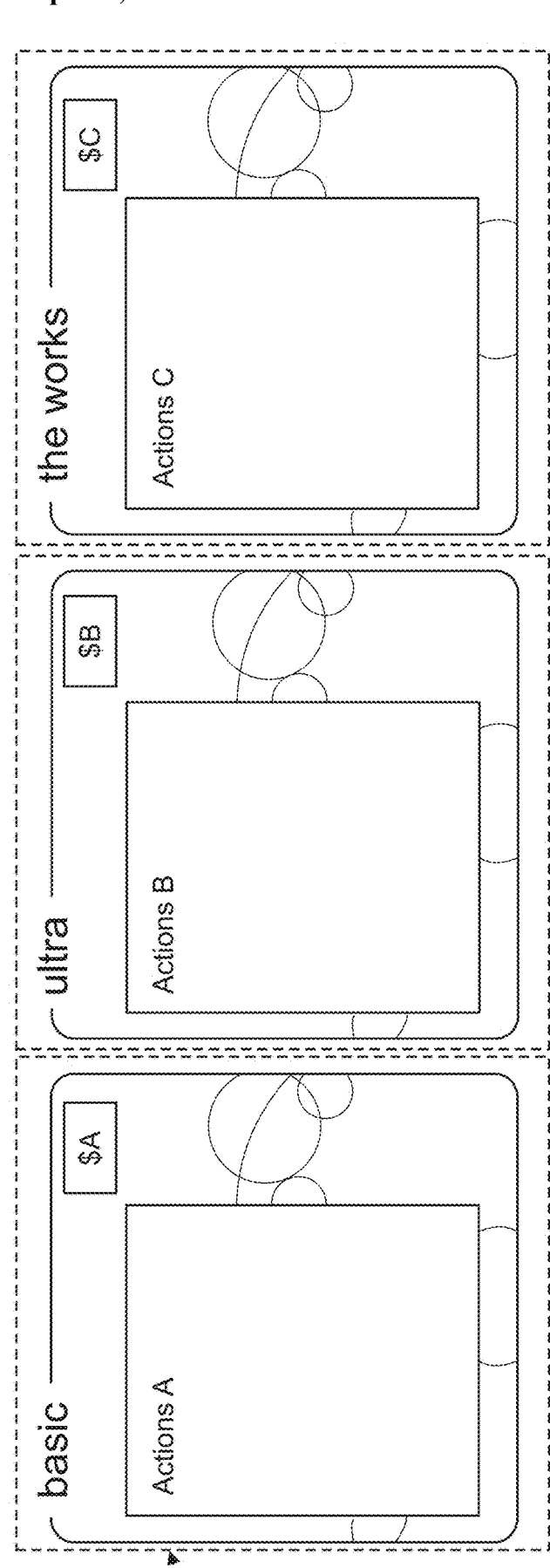
FIG. 4B is a second portion of the display content of FIG. 4A.

FIGS. 4A and 4B illustrate one implementation of customized media content 300 configured to be shown on a display of a fuel dispenser, e.g., the display 14 of the fuel dispenser 16 of FIG. 1, the display 112 of the fuel dispenser 102 of FIG. 2, etc. FIGS. 4A and 4B also illustrate one implementation of default media content 302 configured to be customized to result in a portion of the customized media content 300. The default media content 302 includes default graphical media content promoting car washes. Three types of car washes are included in the default graphical media content: basic, ultra, and the works. (Other types and numbers of car washes are possible.) Each of the types of car washes is associated with a different set of car wash actions (Actions A for basic car wash, Actions B for ultra car wash, and Actions C for the works car wash) and with a different price ($A for basic car wash, $B for ultra car wash, and $C for the works car wash). The car wash actions are associated with car wash action rules at a remote system (e.g., the remote server 12 of FIG. 1, etc.), and the car wash prices are associated with car wash price rules at the remote system.

The element (e.g., the intermediary or the fuel dispenser) performing the customization is configured to receive the default graphical media content promoting car washes and the car wash action rules and the car wash price rules associated therewith. Using local car wash action rules and local car wash price rules, e.g., as received from a POS configurator (e.g., the POS configurator 36 of FIG. 1, etc.), or other computing system, the element is configured to replace the car wash actions in the default graphical media content with the particular car wash actions defined in the local car wash action rules, e.g., replace basic car wash Actions A with two-step pre-soak, high pressure rinse, and high volume air dry, replace ultra car wash Actions B with two-step pre-soak, high pressure rinse, high volume air dry, and high pressure undercarriage spray, and replace the works car wash Actions C with two-step pre-soak, high pressure rinse, high volume air dry, high pressure undercarriage spray, rust inhibitor, and color treatment. The particular actions available for each of the basic, ultra, and the works car washes at the particular car wash at issue can thus be shown on the display. The element is also configured to replace the car wash prices in the default graphical media content with the particular car wash prices defined in the local car wash action rules, e.g., replace basic car wash price $A with $15, replace ultra car wash price $B with $25, and replace the works car wash price $C with $40. The particular prices for each of the basic, ultra, and the works car washes at the particular car wash at issue can thus be shown on the display.

Some car wash types may not be available at all sites that receive the default media content 302. The element is configured to remove any car wash types (outlined in dotted lines in FIG. 4B) that are unavailable, using car wash type rules received from the remote system and using local car wash type rules defining the types of available car washes.

The customized media content 300 in this illustrated implementation includes other configurable default media content in addition to the default media content 302 regarding car wash types, actions, and prices. The other configurable default media content includes a current time (shown as 11:51 AM in FIG. 4A), a current weather condition (shown as a temperature of) 85°, a current weather forecast (shown as a daily high temperature of 93° and a daily low temperature of 74°), available fuel types/grades (shown as regular/ 87 octane, plus/89 octane, and premium/93 octane), prices of each available fuel grade (shown as $3.179 per gallon for regular, as $3.329 per gallon for plus, and $3.629 per gallon for premium), and current cost and amount of dispensed fuel (shown as $1.40 and 0.385 gallons). A remainder of the customized media content 300 is defined by the default media content, including an arrangement of the graphics, background branded images, color scheme (shown in gray-scale in FIGS. 4A and 4B, but color is possible), and font.

Figure 5:
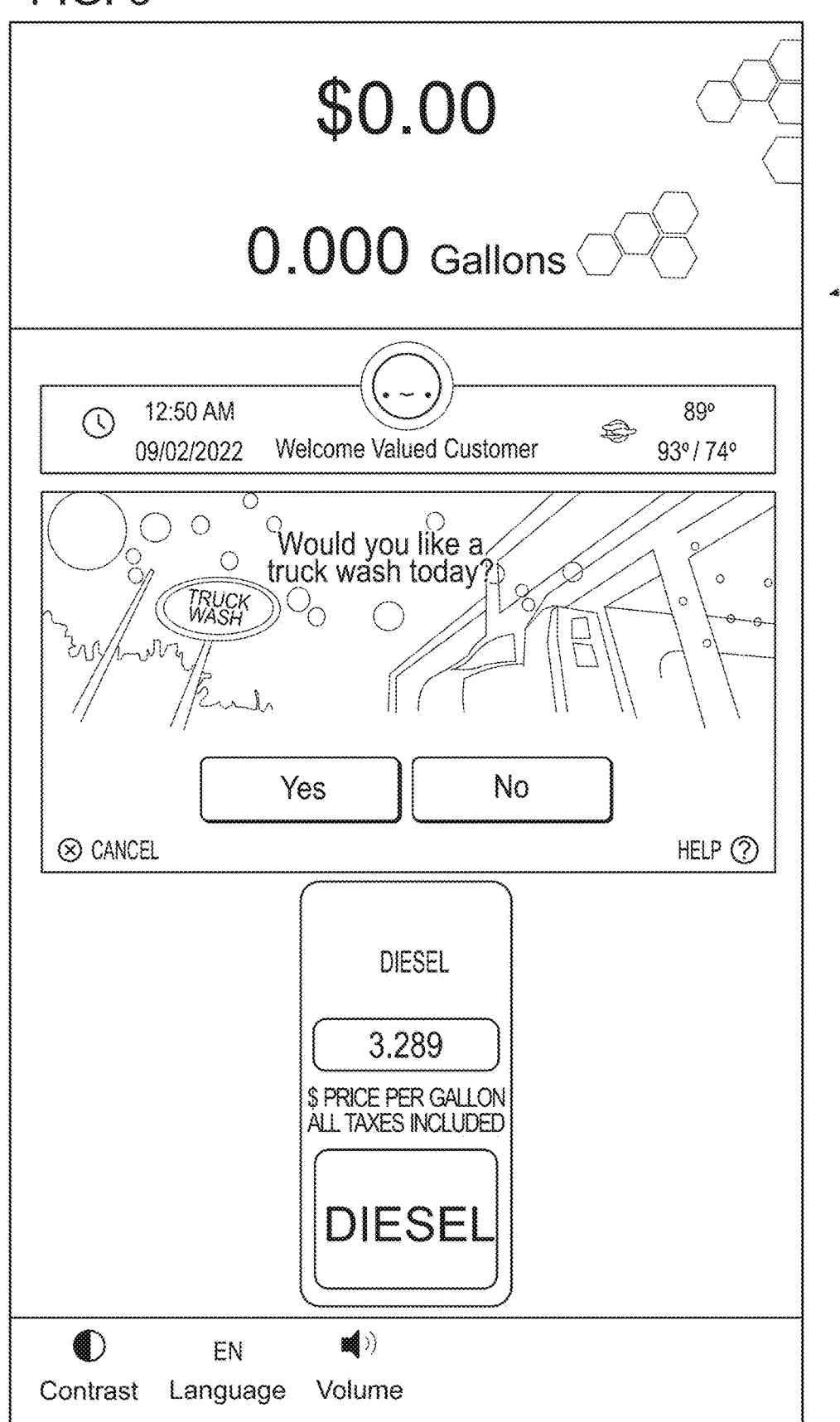
FIG. 5 is another implementation of display content.
Figure 6:
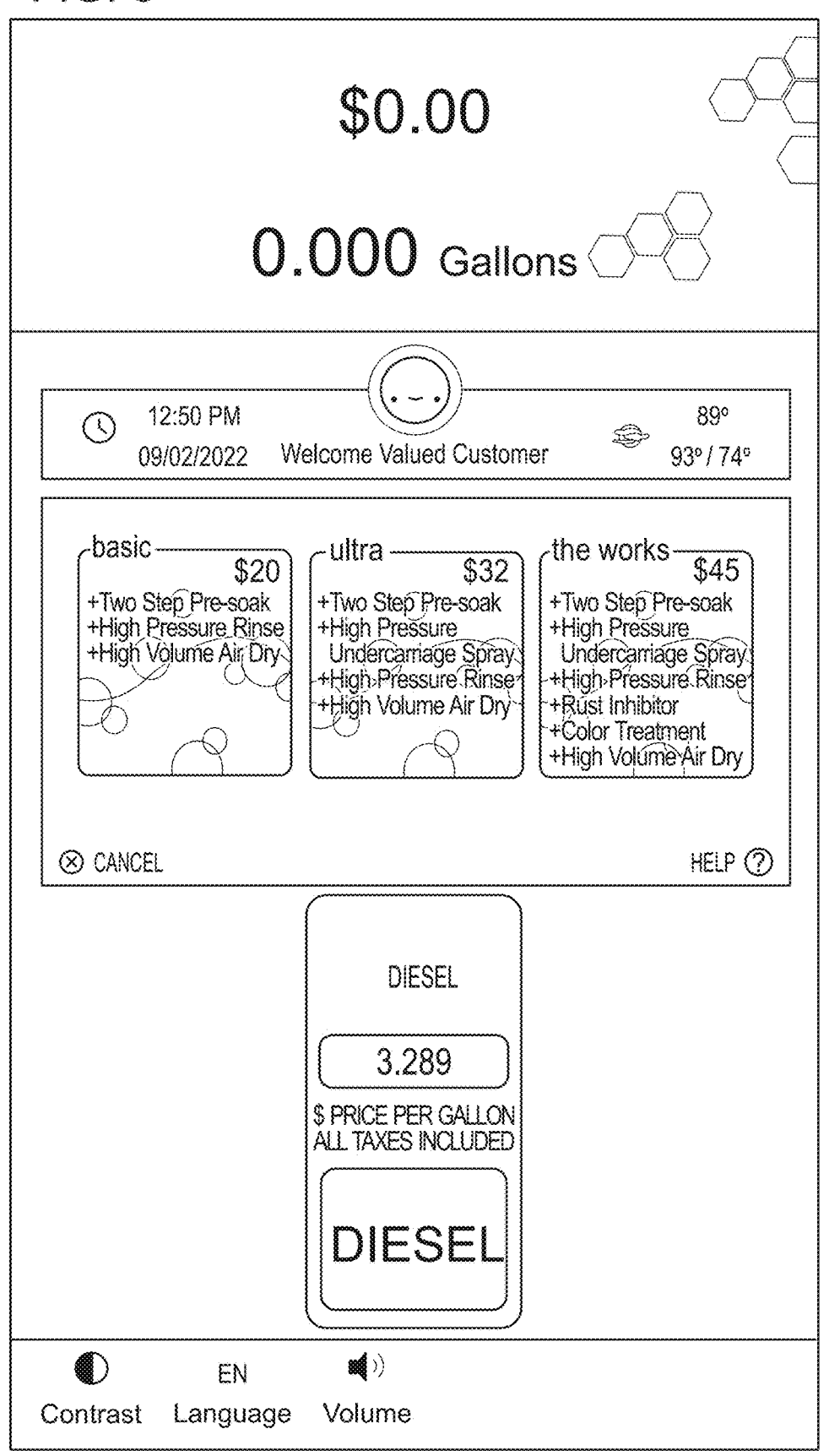
FIG. 6 is yet another implementation of display content.

FIG. 5 illustrates another implementation of customized media content 400 configured to be shown on a display of a fuel dispenser, e.g., the display 14 of the fuel dispenser 16 of FIG. 1, the display 112 of the fuel dispenser 102 of FIG. 2, etc. The customized media content 400 in this illustrated implementation includes configurable default media content including a current time (shown as 12:50 PM in FIG. 5), a current weather condition (shown as a temperature of 89°), a current weather forecast (shown as a daily high temperature of 93° and a daily low temperature of 74°), available fuel type (shown as diesel), prices of each available fuel type (shown as $3.289 per gallon for diesel), and current cost and amount of dispensed fuel (shown as $0.00 and 0.000 gallons). A remainder of the customized media content 400 is defined by the default media content, including an arrangement of the graphics, background images (which may be branded), color scheme (shown in grayscale in FIG. 5, but color is possible), font, and car wash promotion. The car wash promotion includes Yes/No user-selectable icons. In response to receipt of a "Yes" user input, the customized media content 400 changes to a different customized media content 402, one implementation of which is shown in FIG. 6. The customized media content 402 of FIG. 6 includes car wash type, car wash action, and car wash price information similar to that discussed above regarding the customized media content 302 of FIG. 4B. In this illustrated embodiment, the car wash types and car wash actions are the same as in FIGS. 4A and 4B, but the car wash prices are different to reflect different local pricing rules for trucks (shown as $20 for basic car wash, $32 for ultra car wash, and $45 for the works car wash).

Figure 7:
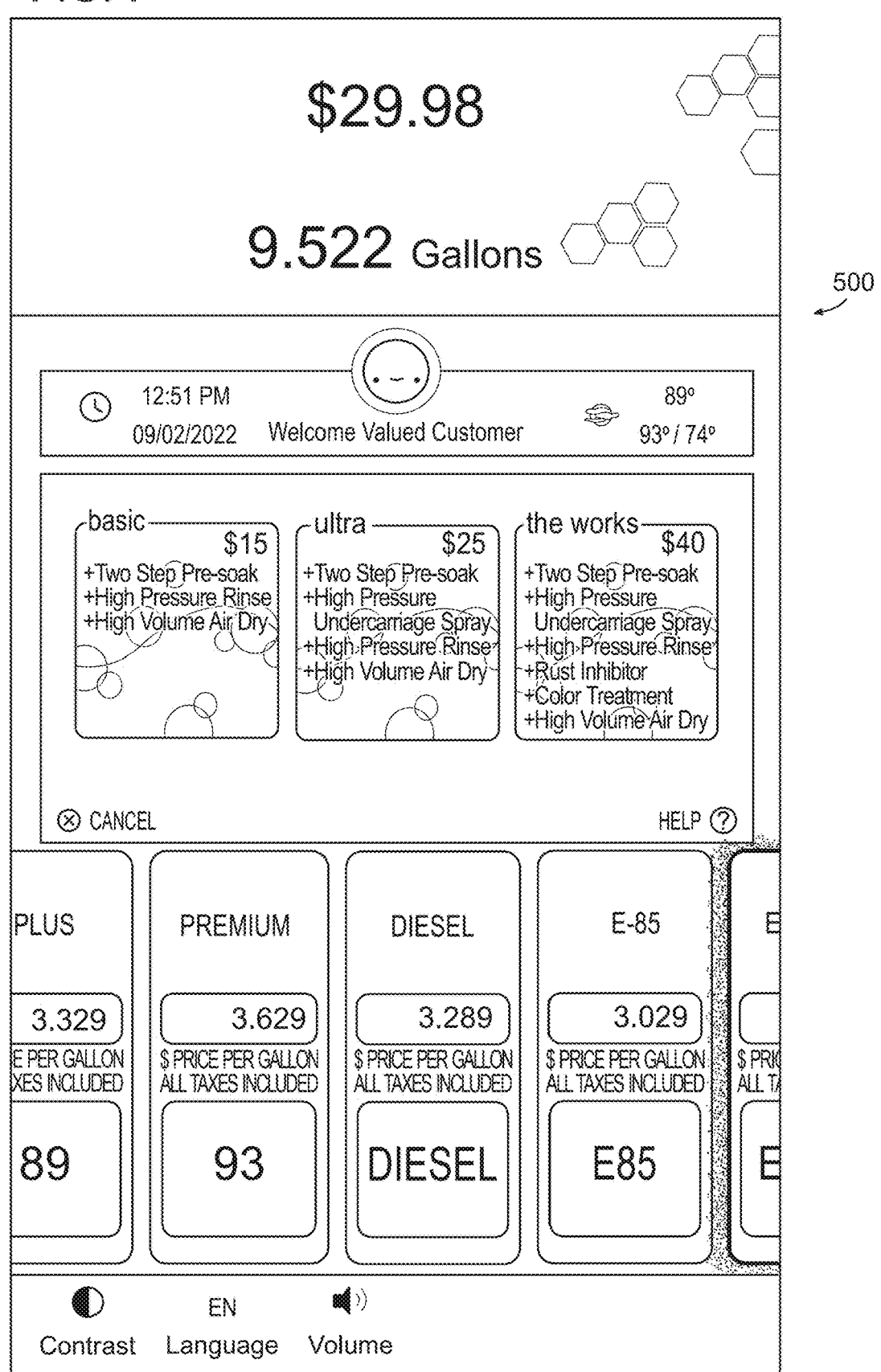
FIG. 7 is still another implementation of display content.

FIG. 7 illustrates another implementation of customized media content 500 configured to be shown on a display of a fuel dispenser, e.g., the display 14 of the fuel dispenser 16 of FIG. 1, the display 112 of the fuel dispenser 102 of FIG. 2, etc. The customized media content 500 in this illustrated implementation is similar to the customized media content 300 of FIG. 4A except that the customized media content 500 includes more available types of fuel (shown as plus (gasoline grade: 89 octane), premium (gasoline grade: 93 octane), diesel, and E-85 (ethanol fuel blend of 85% ethanol fuel and 15% gasoline). At least one additional fuel type is available by scrolling left and/or right, e.g., E-5, E-10, E-15, E-25, E-100, regular (gasoline grade: 87 octane), etc.

The customized media content 300 of FIG. 4A, the customized media content 400 of FIG. 5, the customized media content 402 of FIG. 6, and the customized media content 500 of FIG. 7 each show an implementation of content configured to be shown on a display of a fuel dispenser that shows a customer all the information the customer needs for their fueling experience, including fuel types, fuel grades (if applicable), and payment information, as well as media content, including relevant promotions, relevant entertainment, geographically relevant information (e.g., traffic, weather, etc.), and/or relevant advertisements, customer loyalty information, and customer welcome/thank you messages. A merchant may thus be able to increase customer loyalty through a simple interactive fueling experience that occurs all on a single display (which as discussed above may include one display screen or side-by-side display screens to increase display viewing area).

Figure 8:
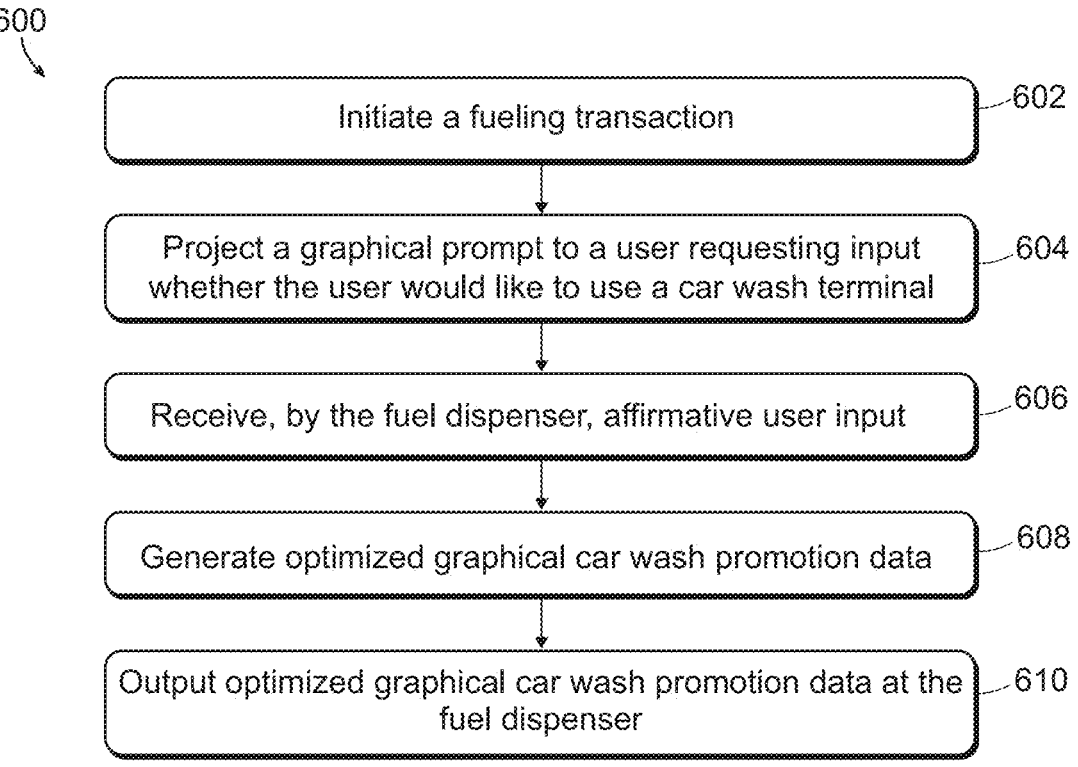
FIG. 8 is a flowchart of another implementation of a method for dynamic management of display content.

FIG. 8 illustrates another exemplary method 600 of dynamic management of display content. The method 600 is described for ease of explanation with respect to the system 10 of FIG. 1, the customized media content 400 of FIG. 5, and the customized media content 402 of FIG. 6 but can be similarly implemented with respect to other terminals and other media content.

The method 600 includes a user interacting with the fuel dispenser 16 to initiate 602 a fueling transaction. During the fueling transaction, the display 14 of the fuel dispenser 16 projects 604 a graphical prompt to the user via the customized media content 400 characterizing instructions for the user to provide an input (Yes/No) to the fuel dispenser 16 that indicates whether they would like to use the car wash terminal located at the fueling station at which the fuel dispenser 16 is located.

In response to receipt 606, by the fuel dispenser 16, of an affirmative input ("Yes") indicating that the user would like to use the car wash terminal at the fueling station, the dynamic media engine 38 is configured to generate 608 optimized graphical promotion data characterizing an optimized car wash graphical advertisement that characterizes an optimized offer for the purchase of car wash services offered by the car wash terminal. The generating 608 is thus performed on demand in real time with the user's selection, which may allow the generating 608 to consider the most recent information received from the remote server 12 and the POS configurator 36. The generating 608 includes customizing default media content transmitted by the remote server 12 to the fuel dispenser 16 (directly or indirectly) e.g., the dynamic media engine 38 of the fuel dispenser 16 customizing the default media content using one or more local rules received from the POS configurator 36 based on based on the determined relationship between the default graphical promotion data and the one or more pricing rules as determined by the remote server 12, e.g., the remote configurator 32. After generating 608 the interlaced graphical image, the fuel dispenser 16, e.g., the dynamic media engine 38, provides the interlaced graphical image to the display 14 such that the interlaced graphical image is output 610, e.g., displayed, to the user. In some implementations, the display 14 can include a touchscreen, and the interlaced graphical image can be depicted on the display 14 as a selectable graphical icon, such that a user touching the display 14 in the region of the graphical icon permits the user to utilize the car wash terminal in accordance with the services characterized by the car wash graphical advertisement presented in the interlaced graphical image. As such, the methods and systems described herein provide for the remote creation and deployment of dynamic graphical content that can be interlaced with fueling-station specific and originated pricing information to create dynamic graphical content characterizing locally available goods and/or services available at the fueling station.

For example, in some implementations, the fuel dispenser 16, e.g., the dynamic media engine 38, receives, from the remote server 12 and via the Edge box 18, (1) a relationship algorithm output by the remote configurator 32, (2) default car wash graphical promotion data, (3) tags characterizing the default car wash graphical promotion data, and (4) tags characterizing one or more car wash pricing rules. The fuel dispenser 16, e.g., the dynamic media engine 38, also receives one or more local car wash pricing rules from the POS configurator 36. The generating 608 of the optimized graphical promotion data includes the fuel dispenser 16, e.g., the dynamic media engine 38, determining, based on the received one or more local car wash pricing rules, a numerical car wash price graphic that includes the price characterized by the one or more local car wash pricing rules and an association of the numerical car wash price graphic with the one or more local car wash pricing rules. The fuel dispenser 16, e.g., the dynamic media engine 38, executes the received relationship algorithm, using the received tags characterizing the default car wash graphical promotion data and the received tags characterizing the one or more car wash pricing rules that are characterized by the numerical car wash price graphic, to determine an association of the numerical car wash price graphic with the received default car wash graphical promotion data. The fuel dispenser 16, e.g., the dynamic media engine 38, based on the determined association of the numerical car wash price graphic with the default car wash graphical promotion data, interlaces onto the default car wash graphical car wash advertisement characterized by the default car wash graphical promotion data to generate 608 an interlaced graphical image containing a car wash graphical advertisement featuring the price for the service characterized by the graphical advertisement. After generating 608 the interlaced graphical image, the fuel dispenser 16, e.g., the dynamic media engine 38, provides the interlaced graphical image to the display 14 such that the interlaced graphical image is displayed to the user, for example as shown in FIG. 6.

Figure 9:
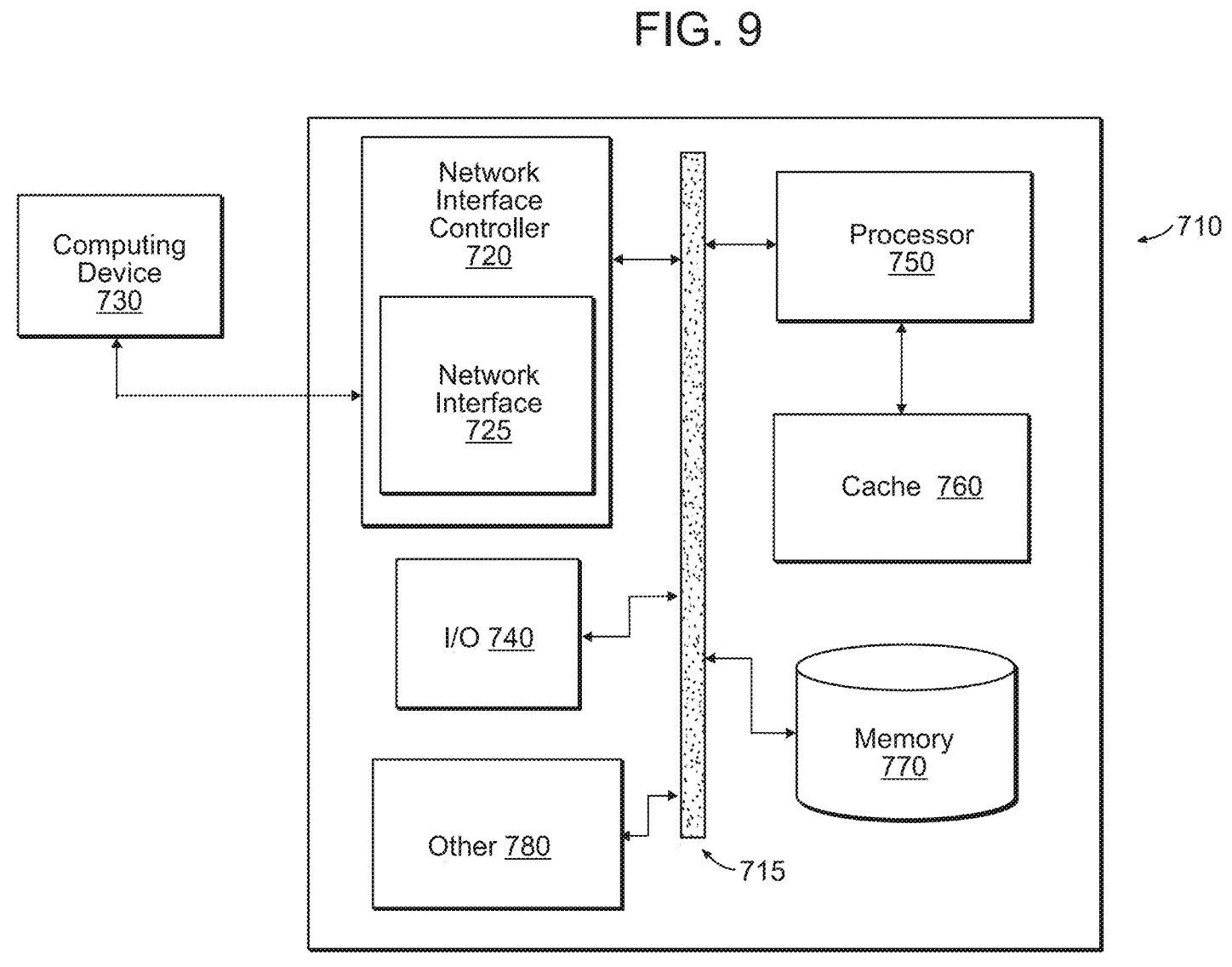

FIG. 9 illustrates one embodiment of a computing system 710 suitable for use in implementing computerized components described herein. In broad overview, the computing system 710 includes a processor 750 configured to perform actions in accordance with instructions, and memory devices 760 and/or 770 configured to store instructions and data. The illustrated example computing system 710 includes one or more processors 750 in communication, via a bus 715, with the memory 770 and with at least one network interface controller 720 with a network interface 725 for connecting to external devices 730, e.g., a computing device (such as a mobile phone, a tablet, a laptop, a server, etc.). The one or more processors 750 are also configured to be in communication, via the bus 715, with each other and with any I/O devices at an I/O interfaces 740, and any other devices 780. The processor 750 illustrated incorporates, or is directly connected to, the cache memory 760. Generally, a processor will execute instructions received from memory. In some embodiments, the computing system 710 can be configured within a cloud computing environment, a virtual or containerized computing environment, and/or a web-based microservices environment.

In more detail, the processor 750 can be any logic circuitry that processes instructions, e.g., instructions fetched from the memory 770 or cache 760. In many embodiments, the processor 750 is an embedded processor, a microprocessor unit or special purpose processor. The computing system 710 can be based on any processor, e.g., suitable digital signal processor (DSP), or set of processors, capable of operating as described herein. In some embodiments, the processor 750 can be a single core or multi-core processor. In some embodiments, the processor 750 can be composed of multiple processors.

The memory 770 can be any device suitable for storing computer readable data. The memory 770 can be a device with fixed storage or a device for reading removable storage media. Examples include all forms of non-volatile memory, media and memory devices, semiconductor memory devices (e.g., EPROM, EEPROM, SDRAM, flash memory devices, and all types of solid state memory), magnetic disks, and magneto optical disks. A computing device 710 can have any number of memory devices 770.

The cache memory 760 is generally a form of high-speed computer memory placed in close proximity to the processor 750 for fast read/write times. In some implementations, the cache memory 760 is part of, or on the same chip as, the processor 750.

The network interface controller 720 is configured to manage data exchanges via the network interface 725. The network interface controller 720 handles the physical, media access control, and data link layers of the Open Systems Interconnect (OSI) model for network communication. In some implementations, some of the network interface controller's tasks are handled by the processor 750. In some implementations, the network interface controller 720 is part of the processor 750. In some implementations, a computing device 710 has multiple network interface controllers 720. In some implementations, the network interface 725 is a connection point for a physical network link, e.g., an RJ 45 connector. In some implementations, the network interface controller 720 supports wireless network connections and an interface port 725 is a wireless Bluetooth transceiver. Generally, a computing device 710 can be configured to exchange data with other network devices 730, such as computing device 730, via physical or wireless links to a network interface 725. In some implementations, the network interface controller 720 implements a network protocol such as LTE, TCP/IP Ethernet, IEEE 802.11, IEEE 802.16, Bluetooth, or the like.

The other computing devices 730 are connected to the computing device 710 via a network interface port 725. The other computing device 730 can be a peer computing device, a network device, a server, or any other computing device with network functionality. For example, a computing device 730 can be a computing device associated with a user of a fuel dispenser or other terminal. In some embodiments, the computing device 730 can be a network device such as a hub, a bridge, a switch, or a router, connecting the computing device 710 to a data network such as the Internet.

In some uses, the I/O interface 740 supports an input device and/or an output device (not shown). In some uses, the input device and the output device are integrated into the same hardware, e.g., as in a touch screen. In some uses, such as in a server context, there is no I/O interface 740 or the I/O interface 740 is not used. In some uses, additional other components 780 are in communication with the computer system 710, e.g., external devices connected via a universal serial bus (USB).

The other devices 780 can include an I/O interface 740, external serial device ports, and any additional co-processors. For example, a computing system 710 can include an interface (e.g., a universal serial bus (USB) interface, or the like) configured to connect input devices (e.g., a keyboard, microphone, mouse, or other pointing device), output devices (e.g., video display, speaker, refreshable Braille terminal, or printer), or additional memory devices (e.g., portable flash drive or external media drive). In some implementations an I/0 device is incorporated into the computing system 710, e.g., a touch screen on a tablet device. In some implementations, a computing device 710 includes an additional device 780 such as a co-processor, e.g., a math co-processor that is configured to assist the processor 750 with high precision or complex calculations.

One skilled in the art will appreciate further features and advantages of the devices, systems, and methods based on the above-described embodiments. Accordingly, this disclosure is not to be limited by what has been particularly shown and described, except as indicated by the appended claims. All publications and references cited herein are expressly incorporated herein by reference in their entirety for all purposes.

Those skilled in the art will understand that the systems, devices and methods specifically described herein and illustrated in the accompanying drawings are non-limiting exemplary embodiments and that the scope of the present invention is defined solely by the claims. The features illustrated or described in connection with one exemplary embodiment may be combined with the features of other embodiments. Such modifications and variations are intended to be included within the scope of the present invention.

The present disclosure has been described above by way of example only within the context of the overall disclosure provided herein. It will be appreciated that modifications within the spirit and scope of the claims may be made without departing from the overall scope of the present disclosure.

What is claimed is:

1. A media management system, comprising:
a terminal configured to display customized graphical media content on a display of the terminal, the customized graphical media content customized dynamically at the terminal in response to a user interaction with the terminal and characterizing default graphical media content corresponding to default data configured at and received from a remote server;
wherein the customized graphical media content is customized based on a relationship data defining degree of similarity between the default data and at least one first rule configured at the remote server, the relationship data generated via executable relationship logic configured at the remote server, which when executed outputs the relationship data, the at least one first rule defining the customization of the default graphical media content, the default data including the relationship data; and
the customized graphical media content is customized based on at least one second rule configured locally to the terminal and corresponding to the at least one first rule.

2. The system of claim 1, wherein the terminal is configured to receive the default data directly from the remote server; and
the terminal is configured to customize the received default graphical media content.

3. The system of claim 1, wherein the terminal is configured to receive the default data indirectly from the remote server via an intermediary computing system; and
the terminal is configured to customize the received default graphical media content.

4. The system of claim 1, wherein an intermediary computing system is configured to receive the default data from the remote server; and
the intermediary computing system is configured to customize the received default graphical media content and to provide the customized graphical media content to the terminal.

5. The system of claim 1, wherein the interaction of the user with the terminal includes a user input to the terminal.

6. The system of claim 1, wherein the default graphical media content includes default graphical promotion data characterizing default media content; and
the customizing includes adding price information.

7. The system of claim 1, wherein the terminal is a fuel dispenser;
the default graphical media content includes content regarding car washing; and
the customizing includes customizing at least one of car wash price information, car wash type information, and car wash action information.

8. The system of claim 1, wherein the terminal is a fuel dispenser;
the default graphical media content includes content regarding fuel; and

the customizing includes customizing at least one of fuel price information, fuel type information, and fuel grade information.

9. The system of claim 1, wherein the terminal is a fuel dispenser;
the fuel dispenser is configured to receive the default data directly from the remote server; and
the fuel dispenser is configured to customize the received default graphical media content.

10. The system of claim 1, wherein the terminal is a fuel dispenser;
an intermediary computing system located at a same fueling station as the fuel dispenser is configured to receive the default data directly from the remote server; and
the fuel dispenser is configured to customize the default graphical media content.

11. The system of claim 1, wherein the terminal is a fuel dispenser;
an intermediary computing system located at a same fueling station as the fuel dispenser is configured to receive the default data directly from the remote server;
the intermediary computing system is configured to customize the received default graphical media content; and
the fuel dispenser is configured to receive customized data characterizing the customized graphical media content from the intermediary computing system.

12. The system of claim 1, wherein the terminal is a dispenser configured to dispense a good.

13. The system of claim 1, wherein the terminal is one of an automatic teller machine, an electrical charging kiosk, an air machine, a parking meter, and a vending machine.

14. A computer-implemented method, comprising:
receiving, from a remote server, default data characterizing default graphical media content configured to be displayed on a display of a terminal, the default data including relationship data defining a degree of similarity between the default data and at least one first rule configured at the remote server and defining customization of the default graphical media content, the relationship data generated via executable relationship logic configured at the remote server, which when executed outputs the relationship data;
in response to interaction of a user with the terminal, dynamically customizing the received default graphical media content to include at least one customized aspect specific to at least one of the terminal and a site at which the terminal is located based on the relationship data and at least one second rule configured locally to the terminal and corresponding to the at least one first rule; and
displaying the customized graphical media content on a display of the terminal.

15. The method of claim 14, wherein the terminal receives the default data directly from the remote server, and the terminal customizes the received default graphical media content.

16. The method of claim 14, wherein an intermediary computing system receives the default data directly from the remote server;
the intermediary computing system customizes the received default graphical media content; and
the method further comprises the terminal receiving customized data characterizing the customized graphical media content from the intermediary computing system.

17. The method of claim 14, wherein the default graphical media content includes default graphical promotion data characterizing default media content; and the customizing includes adding price information.

18. The method of claim 14, wherein the terminal is a fuel dispenser.

19. The method of claim 14, wherein the terminal is a dispenser configured to dispense a good.

20. The method of claim 14, wherein the terminal is one of an automatic teller machine, an electrical charging kiosk, an air machine, a parking meter, and a vending machine.

\* \* \* \* \*